(12) United States Patent
Takamine et al.

(10) Patent No.: US 11,754,530 B2
(45) Date of Patent: Sep. 12, 2023

(54) STRUCTURE EVALUATION METHOD AND STRUCTURE EVALUATION SYSTEM

(71) Applicant: KABUSHIKI KAISHA TOSHIBA, Tokyo (JP)

(72) Inventors: Hidefumi Takamine, Tokyo (JP); Yuki Ueda, Kawasaki Kanagawa (JP); Keisuke Ueno, Kawasaki Kanagawa (JP); Takashi Usui, Saitama Saitama (JP); Kazuo Watabe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 17/184,134

(22) Filed: Feb. 24, 2021

(65) Prior Publication Data

US 2022/0082528 A1    Mar. 17, 2022

(30) Foreign Application Priority Data

Sep. 16, 2020  (JP) ................................ 2020-155783

(51) Int. Cl.
*G01N 29/07*      (2006.01)

(52) U.S. Cl.
CPC ..... *G01N 29/07* (2013.01); *G01N 2291/0289* (2013.01); *G01N 2291/2698* (2013.01)

(58) Field of Classification Search
CPC ................... G01N 29/14; G01N 29/07; G01N 2291/0289; G01N 2291/2698; G01N 2291/0258
USPC .......................................................... 73/598
See application file for complete search history.

(56) References Cited

U.S. PATENT DOCUMENTS

| | | | |
|---|---|---|---|
| 10,345,275 B2* | 7/2019 | Takamine | G01N 29/045 |
| 10,613,060 B2* | 4/2020 | Takamine | G01N 29/069 |
| 11,493,335 B2* | 11/2022 | Usui | G01M 5/0066 |
| 11,519,883 B2* | 12/2022 | Iida | G01N 29/4454 |
| 2017/0363586 A1 | 12/2017 | Takamine et al. | |
| 2018/0266999 A1 | 9/2018 | Usui | |
| 2019/0383696 A1 | 12/2019 | Shiotani et al. | |

(Continued)

FOREIGN PATENT DOCUMENTS

| | | |
|---|---|---|
| JP | S54-99487 A | 8/1979 |
| JP | 2018-59808 A | 4/2018 |

(Continued)

*Primary Examiner* — Jacques M Saint Surin
(74) *Attorney, Agent, or Firm* — Finnegan, Henderson, Farabow, Garrett & Dunner, LLP

(57) ABSTRACT

According to one embodiment, a structure evaluation system includes a wave guide, a first sensor, a second sensor, and a calculation part. The wave guide is formed in a rod shape, is inserted into a hole that is formed at a predetermined depth from a surface of a measurement target, and has one end fixed to a deepest portion of the hole. The first sensor is provided at the other end of the wave guide at a position that is substantially the same as the surface. The second sensor is provided on the surface of the measurement target. The calculation part estimates a depth of damage occurring in the measurement target from the surface on the basis of a first detection value of an elastic wave transmitted to the measurement target which is detected by the first sensor through the wave guide and a second detection value obtained by an elastic wave which is detected by the second sensor.

14 Claims, 6 Drawing Sheets

(56) References Cited

U.S. PATENT DOCUMENTS

| | | | |
|---|---|---|---|
| 2021/0181157 A1* | 6/2021 | Takamine | G01N 29/2437 |
| 2022/0187253 A1* | 6/2022 | Takamine | G01N 29/341 |

FOREIGN PATENT DOCUMENTS

| | | |
|---|---|---|
| JP | 2018-155662 A | 10/2018 |
| WO | WO 2017/217034 A1 | 12/2017 |
| WO | WO 2019/167137 A1 | 9/2019 |

* cited by examiner

=

−

−

=

STRUCTURE EVALUATION METHOD AND STRUCTURE EVALUATION SYSTEM

CROSS-REFERENCE TO RELATED APPLICATION

This application is based upon and claims the benefit of priority from Japanese Patent Application No. 2020-155783, filed Sep. 16, 2020; the entire contents of (all of) which are incorporated herein by reference.

FIELD

Embodiments described herein relate generally to a structure evaluation method and a structure evaluation system.

BACKGROUND

In recent years, problems associated with the aging of structures, such as bridges, constructed for the period of high economic growth have become apparent. A technique is known which monitors the state of a structure in order to suppress damage that may occur in the structure. For example, a technique is known which detects damage in a structure using an acoustic emission (AE) method that detects the occurrence of an internal crack or elastic waves generated with the progress of the internal crack using a high-sensitivity sensor.

The acoustic emission is the emission of the elastic waves generated with the progress of a fatigue crack in a material. In the AE method, the elastic waves are detected as a voltage signal (AE signal) by an AE sensor using a piezoelectric element. The AE signal is detected as a sign before the breakage of the material occurs. The frequency of occurrence and intensity of the AE signal are useful as indexes indicating the soundness of the material. Therefore, a technique for detecting a sign of the deterioration of structures using the AE method has been actively researched. For example, in the corrosion diagnosis of petroleum tanks and the manufacturing process of mechanical devices, a detection technique using the AE method has been widely used mainly in Europe and the United States. In addition, the detection technique using the AE method is being standardized.

The principle of the AE method makes it possible to specify the position of a source from the difference between the arrival times of elastic waves to a plurality of sensors corresponding to the number of dimensions+1. That is, the AE method can specify a three-dimensional position with four or more sensors.

For example, in a thick three-dimensional structure, such as a road slab, in a case in which an impact is applied to a road surface with a uniform distribution due to rainfall or the like, a planar elastic wave source distribution of the road can be calculated by AE sensing using a plurality of AE sensors which are provided on the lower surface of the slab.

While the elastic wave sources are originally uniformly distributed, the density of the observed elastic wave source is reduced in a region having internal damage. It is possible to estimate the planar position of the damaged region in the slab from the obtained density distribution. However, it is very difficult to specify the position of damage in the depth direction in a thick three-dimensional structure, such as a road slab, using only the sensor provided on one surface.

An embodiment of the present invention provides a structure evaluation method and a structure evaluation system that can measure the depth of damage occurring in a measurement target such as a structure.

DETAILED DESCRIPTION

According to one embodiment, a structure evaluation method includes: detecting a first detection value of an elastic wave generated in a measurement object by a first sensor, through a rod-shaped wave guide which is inserted into a hole formed to a predetermined depth from a surface of the measurement object, one end side of which is fixed to a deepest part of the hole, the other end side of which is substantially the same position as the surface, and on which the first sensor is provided; detecting a second detection value of the elastic wave by a second sensor provided on the surface; and estimating a depth from the surface to a damage inside the measurement object, based on the first detection value and the second detection value.

According to one embodiment, a structure evaluation system includes a wave guide, a first sensor, a second sensor, and a calculation part. The wave guide is formed in a rod shape, is inserted into a hole that is formed at a predetermined depth from a surface of a measurement target, and has one end fixed to a deepest portion of the hole. The first sensor is provided at the other end of the wave guide at a position that is substantially the same as the surface. The second sensor is provided on the surface of the measurement target. The calculation part estimates a depth of damage occurring in the measurement target from the surface on the basis of a first detection value of an elastic wave transmitted to the measurement target which is detected by the first sensor through the wave guide and a second detection value obtained by an elastic wave which is detected by the second sensor.

Various Embodiments will be described hereinafter with reference to the accompanying drawings.

Hereinafter, structure evaluation methods and structure evaluation systems according to embodiments will be described with reference to the drawings.

Figure 1:
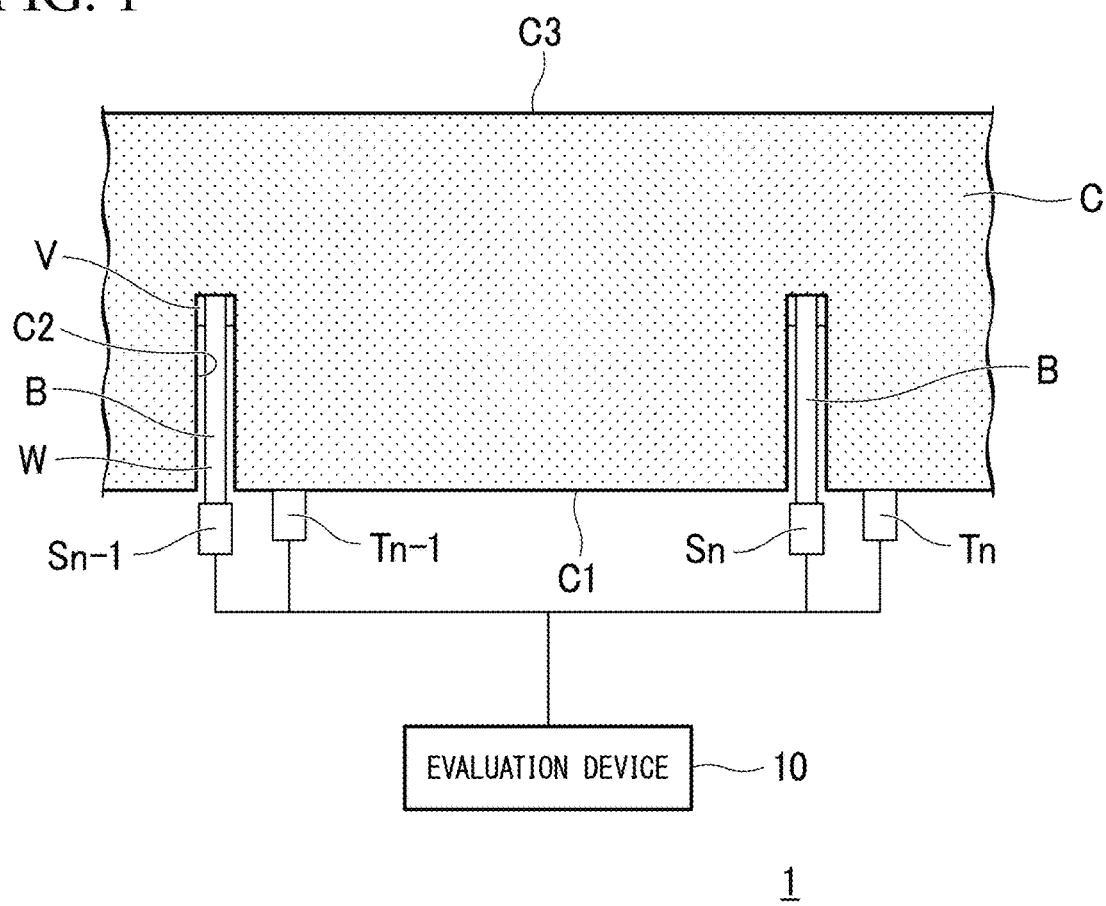
FIG. 1 is a cross-sectional view illustrating a configuration of a structure evaluation system according to a first embodiment.

As illustrated in FIG. 1, a structure evaluation system 1 includes a plurality of first sensors Sn (n is a natural number)

and a plurality of second sensors Tm (m is a natural number) that are provided on a measurement target C and an evaluation device 10 that evaluates the soundness of the measurement target C.

The measurement target C to be measured is formed of, for example, a concrete member. The measurement target C is, for example, a road slab. The measurement target may be a large concrete structure such as a dam, a bridge, or a building.

The plurality of first sensors Sn and the plurality of second sensors Tm are provided on a bottom surface C1 (surface) of the measurement target C. The plurality of first sensors Sn and the plurality of second sensors Tm are connected to the evaluation device 10.

For example, the plurality of first sensors Sn and the plurality of second sensors Tm are arranged in a matrix on the bottom surface C1. The first sensor Sn and the second sensor Tm are, for example, AE sensors. The first sensor Sn and the second sensor Tm detect, for example, elastic waves (AE waves) propagated in the measurement target C. The first sensor Sn and the second sensor Tm may monitor and detect the elastic waves which have been generated due to damage occurring in the measurement target C.

The second sensor Tm is directly fixed to the bottom surface C1 of the measurement target C. The second sensor Tm directly detects a second detection value obtained by the elastic wave propagated in the measurement target C. The first sensor Sn is fixed to the measurement target C through a wave guide W that is formed in a rod shape. The wave guide W is inserted into a hole C2 that is formed at a predetermined depth from the bottom surface C1 of the measurement target C. The wave guide W is formed in the shape of a rod having a circular cross-section that has an outward shape thinner than the hole C2. The wave guide W is formed of, for example, a rigid metal body. The wave guide W is not limited to the circular cross-section and may be formed to have a rectangular cross-section or a hollow cross-section. The wave guide W is not limited to metal and may be formed of ceramic. The wave guide W may be formed in other shapes or may be made of other materials as long as it is a rod-shaped rigid body that can transmit elastic waves.

Here, the bottom surface C1 (surface) may be, for example, a wall surface of a dam, and the wave guide W may be inserted and fixed to the wall surface in a horizontal direction or an oblique direction. The bottom surface C1 (surface) may be an upper surface of the structure, and the wave guide W may be inserted and fixed to the upper surface in a vertical direction.

One end of the wave guide W is a fixed end that is fixed to the deepest portion of the hole C2 by an adhesive V. The other end of the wave guide W is exposed from the hole C2 and is a free end. The other end of the wave guide W is adjusted to a position that is substantially the same as the bottom surface C1. The first sensor Sn is provided at the other end of the wave guide W. The first sensor Sn detects a first detection value obtained by the elastic waves of the measurement target C through the wave guide W. The evaluation device 10 is connected to the first sensor Sn and the second sensor Tm. The evaluation device 10 acquires the first detection value of the first sensor Sn and the second detection value of the second sensor Tm.

Figure 2:
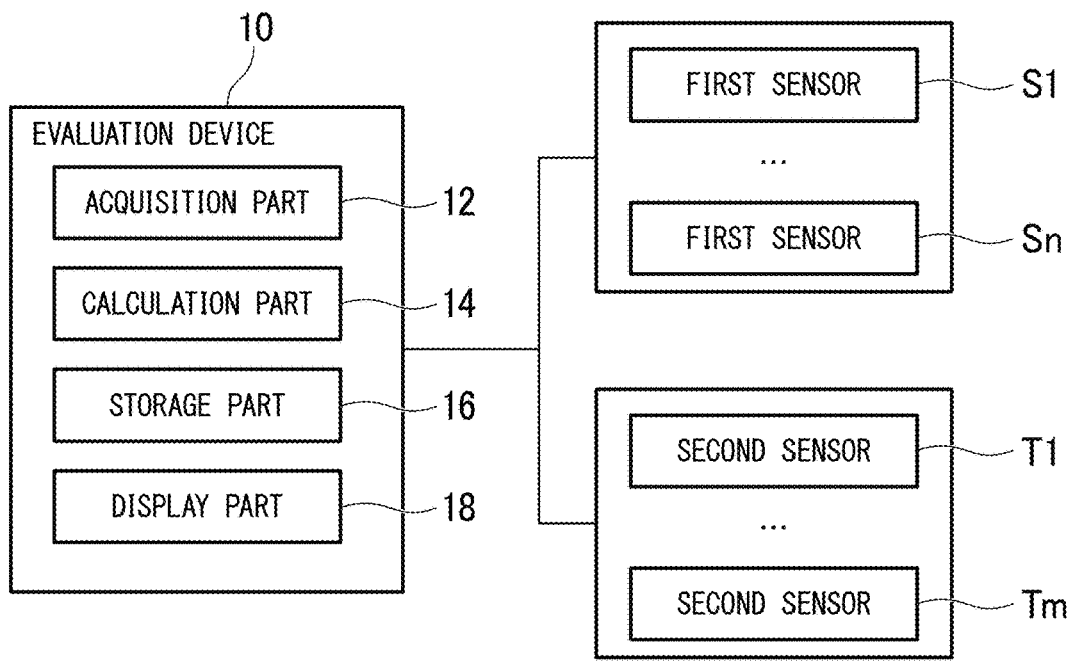
FIG. 2 is a block diagram illustrating the configuration of the structure evaluation system.

As illustrated in FIG. 2, the evaluation device 10 includes an acquisition part 12 that acquires the detection values from the plurality of first sensors Sn and the plurality of second sensors Tm, a calculation part 14 that performs calculation related to the damage of the measurement target C, a storage part 16 that stores data related to the calculation, and a display part 18 that displays a calculation result.

The acquisition part 12 is an interface that acquires data of the detection values wirelessly or in a wired manner. The data acquired by the acquisition part 12 is stored in the storage part 16. The storage part 16 is a storage medium such as a hard disk drive (HDD) or a flash memory. The storage part 16 stores a program related to the calculation of the calculation part 14 in addition to the detection values.

The display part 18 is a display device using, for example, a liquid crystal display or an organic EL display.

For example, the calculation part 14 estimates the depth of the damage of the measurement target C from the surface on the basis of the first detection value and the second detection value acquired by the acquisition part 12. The calculation part 14 estimates the depth of a portion, in which damage has occurred, from the bottom surface C1 on the basis of a difference between first and second feature amounts of the first and second detection values which include the arrival time and waveform of the elastic waves.

Next, a method for evaluating damage that occurs in the measurement target C in the structure evaluation system 1 will be described.

The evaluation device 10 observes the detection values of the plurality of first sensors Sn and the plurality of second sensors Tm over time in a case in which uniform elastic waves are generated in the slab which is the measurement target C, for example, during rainfall. The elastic waves may not be necessarily uniformly generated in the measurement target C. In addition, the elastic waves may be generated from an artificial wave source at a predetermined position. The evaluation device 10 measures the density distribution of an elastic wave source on the basis of, for example, the plurality of second sensors Tm provided on the bottom surface C1 of the measurement target C and the plurality of first sensors Sn through the wave guides W.

In a case in which the elastic wave sources are mainly generated on the upper surface C3 (see FIG. 1) of the slab in a state in which there is no damage in the measurement target C, the elastic waves which are input to the first sensor Sn are propagated from the upper surface C3 of the measurement target C to the wave guide W through a sound portion of concrete and are then input to the first sensor Sn. The elastic waves which are input to the second sensor Tm are propagated from the upper surface C3 of the measurement target C through a sound portion of concrete and are then input to the second sensor Tm. Therefore, in a state in which there is no damage in the measurement target C, there is almost no difference between the first detection value and the second detection value.

Figure 3:
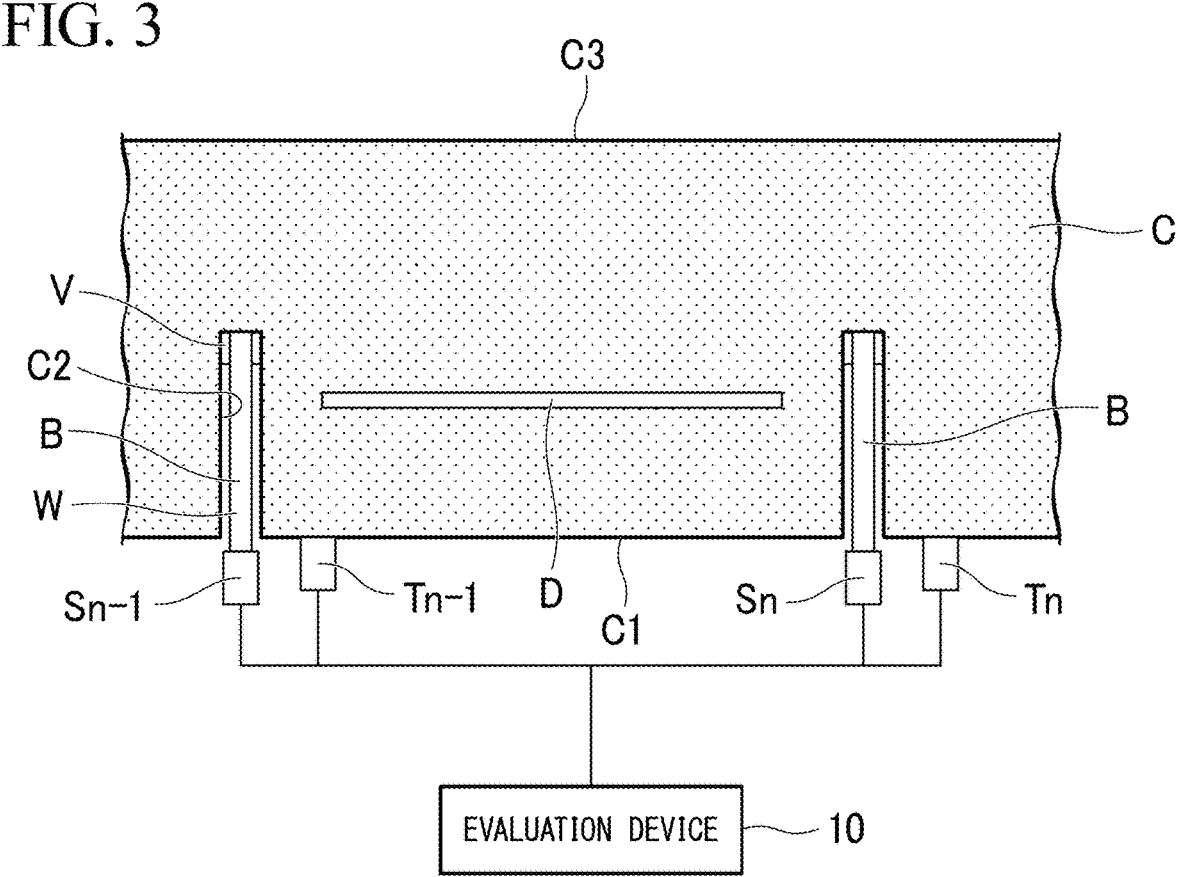
FIG. 3 is a diagram illustrating the measurement of damage occurring in a measurement target by the structure evaluation system.

As illustrated in FIG. 3, in a case in which the elastic wave sources are mainly generated on the upper surface C3 of the slab in a state in which damage D occurs in the measurement target C, the elastic waves which are input to the first sensor Sn are propagated from the upper surface C3 of the measurement target C to the wave guide W through a sound portion of concrete and are then input to the first sensor Sn. Therefore, the first detection value of the elastic waves measured through the wave guide W is not affected by the internal damage D. In contrast, the elastic waves which are input to the second sensor Tm are propagated through the sound portion of the concrete from the upper surface C3 of the measurement target C and are then input to the second sensor Tm through the internal damage D. Therefore, the second detection value of the elastic waves measured at the bottom surface C1 through the internal damage is affected by the internal damage.

Therefore, in the comparison between two distributions of the first detection value and the second detection value, in a case in which damage occurs at a position that is shallower than the position where one end of the wave guide W is fixed from the bottom surface C1, the two distributions are different from each other. In contrast, in a case in which there is no damage at the position that is shallower than the wave guide W from the bottom surface C1, the two distributions are substantially the same. Therefore, the difference between the distributions of the first detection value and the second detection value is calculated to specify whether the internal damage is at a shallow position or a deep position.

Figure 4C:
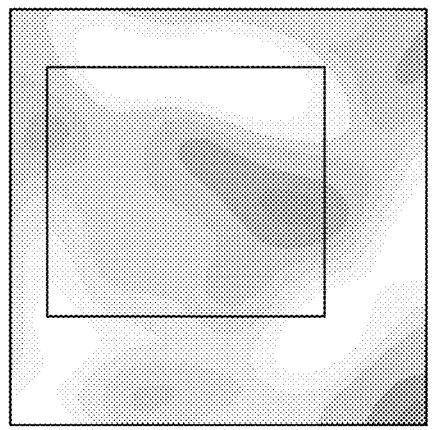
FIGS. 4A to 4C are diagrams illustrating a principle of measuring the damage occurring in the measurement target.
Figure 4B:
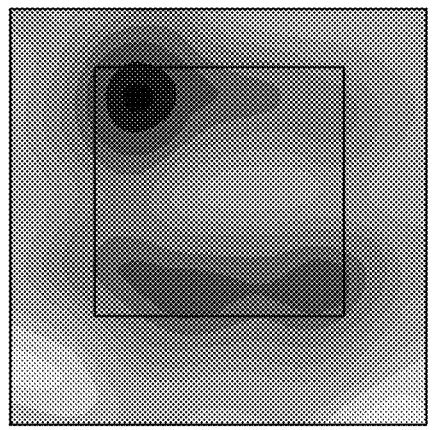
Figure 4A:
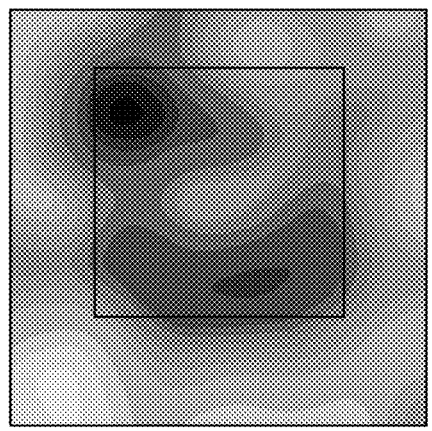

As illustrated in FIGS. 4A to 4C and 5A to 5C, there is a difference between the first detection value and the second detection value depending on whether or not there is damage. In FIGS. 4A to 4C, a distribution (FIG. 4A) is an elastic wave source density distribution based on the second detection value obtained by the second sensor Tm. A distribution (FIG. 4B) is an elastic wave source density distribution based on the first detection value obtained by the first sensor Sn through the wave guide W whose one end is fixed at a shallow position (for example, 10 mm) from the bottom surface C1. In a case in which there is no damage D at the depth from the bottom surface C1 to one end of the wave guide W, elastic waves reach the first sensor Sn and the second sensor Tm without passing through the damage D. Therefore, a difference (FIG. 4C) between the distribution (FIG. 4A) of the first detection value and the distribution (FIG. 4B) of the second detection value is hardly detected.

Figure 5A:
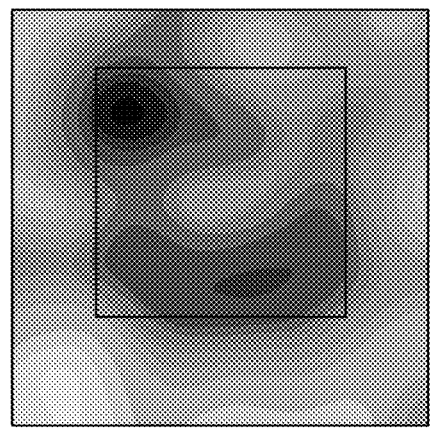
FIGS. 5A to 5C are diagrams illustrating the principle of measuring the damage occurring in the measurement target.
Figure 5B:
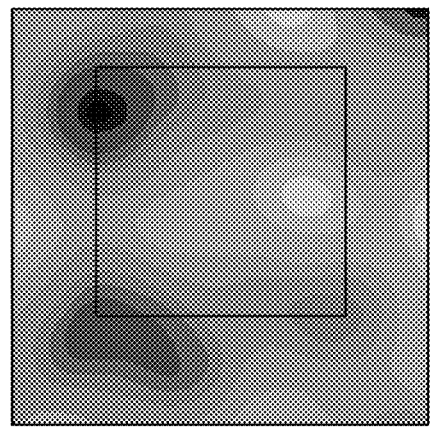
Figure 5C:
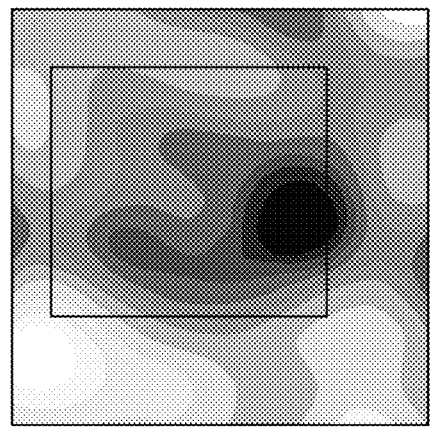

In contrast, in FIGS. 5A to 5C, a distribution (FIG. 5A) is an elastic wave source density distribution based on the second detection value obtained by the second sensor Tm. A distribution (FIG. 5B) is an elastic wave source density distribution based on the first detection value obtained by the first sensor Sn through the wave guide W whose one end is fixed at a deep position (for example, 100 mm) from the bottom surface C1. In a case in which the damage D is present at the depth from the bottom surface C1 to one end of the wave guide W, the elastic waves reach the second sensor Tm through the damage D. In contrast, the elastic waves reach the first sensor Sn through the wave guide W without passing through the damage D. Therefore, a difference (FIG. 5C) between the distribution (FIG. 5A) of the first detection value and the distribution (FIG. 5B) of the second detection value is detected. The differences between a plurality of first detection values and the second detection value of the second sensor Tm are compared to estimate the depth of the damage D in the measurement target C from the bottom surface C1.

Figure 6:
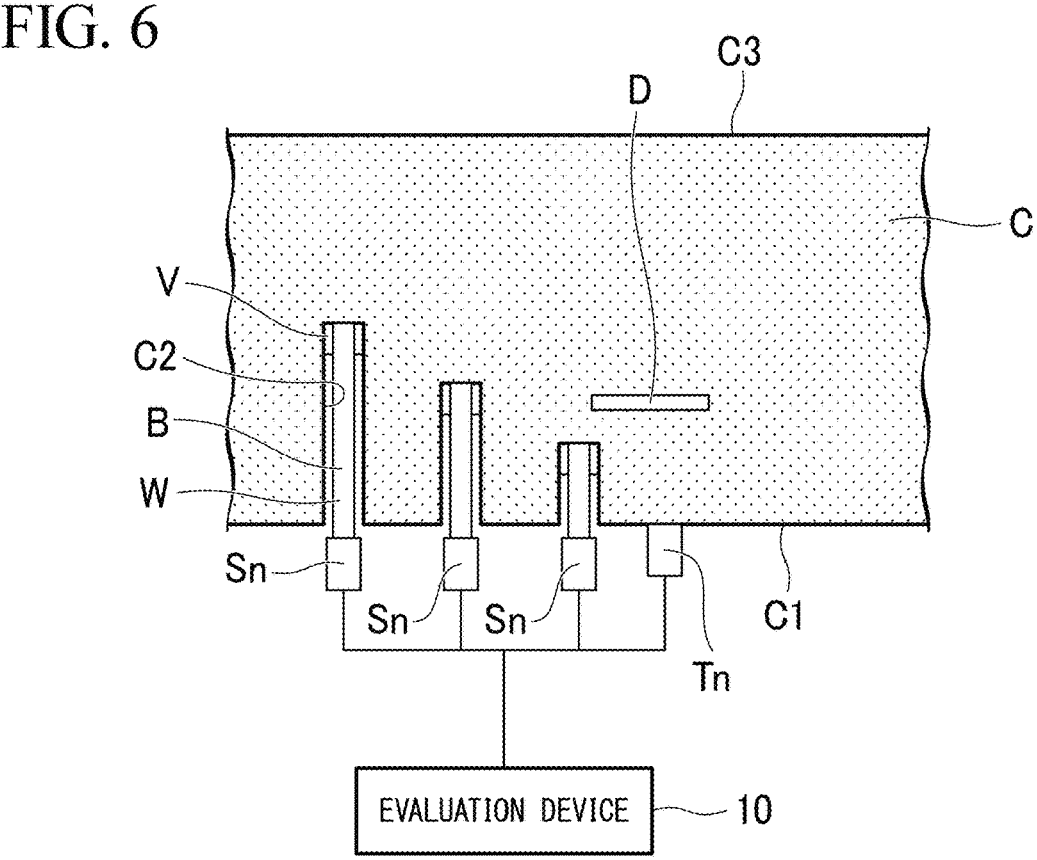
FIG. 6 is a diagram illustrating a principle of estimating the depth of the damage using wave guides having different lengths.

As illustrated in FIG. 6, the holes C2 are formed at different depths in the measurement target C. A plurality of wave guides W which are formed with different lengths corresponding to the lengths of the holes C2 are inserted, and one end of each of the wave guides W is fixed. The plurality of first sensors Sn detect a plurality of first detection values obtained by the elastic waves generated in the measurement target C through the plurality of wave guides W which have different lengths and have one end fixed to the deepest portions of the plurality of holes C2 having different depths. The calculation part 14 can calculate the depth of the damage from the surface on the basis of the plurality of first detection values of the plurality of first sensors Sn and the second detection value of the second sensor Tm.

As described above, according to the structure evaluation method and the structure evaluation system of the embodiment, it is possible to estimate the depth of the damage occurring in the measurement target C. According to the structure evaluation system 1, the difference between the first detection value of the first sensor Sn provided through the wave guide W and the second detection value of the second sensor Tm provided on the bottom surface C1 of the measurement target C is compared according to the height of the wave guide W to estimate the depth of the damage occurring in the measurement target C.

Second Embodiment

A structure evaluation method and a structure evaluation system according to a second embodiment estimate the depth of damage in the measurement target C on the basis of the measurement result of elastic waves generated from the damage occurring in the measurement target C. The structure evaluation system according to the second embodiment has the same configuration as that according to the first embodiment. In the following description, the same configurations as those in the first embodiment have the same names and reference numerals, and a description thereof will be appropriately omitted.

Figure 7:
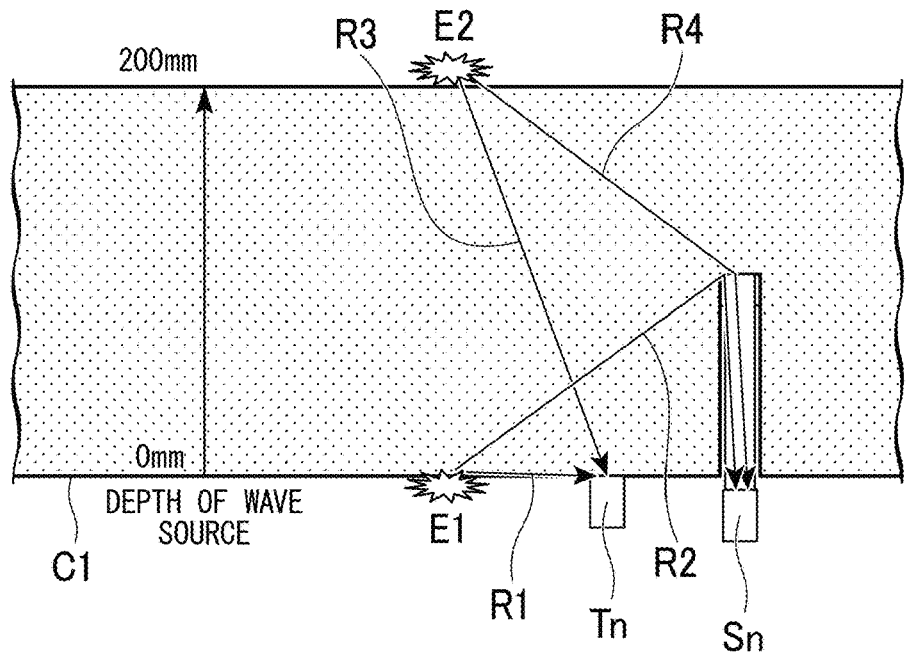
FIG. 7 is a cross-sectional view illustrating the principle of a structure evaluation method according to a second embodiment.
Figure 8:
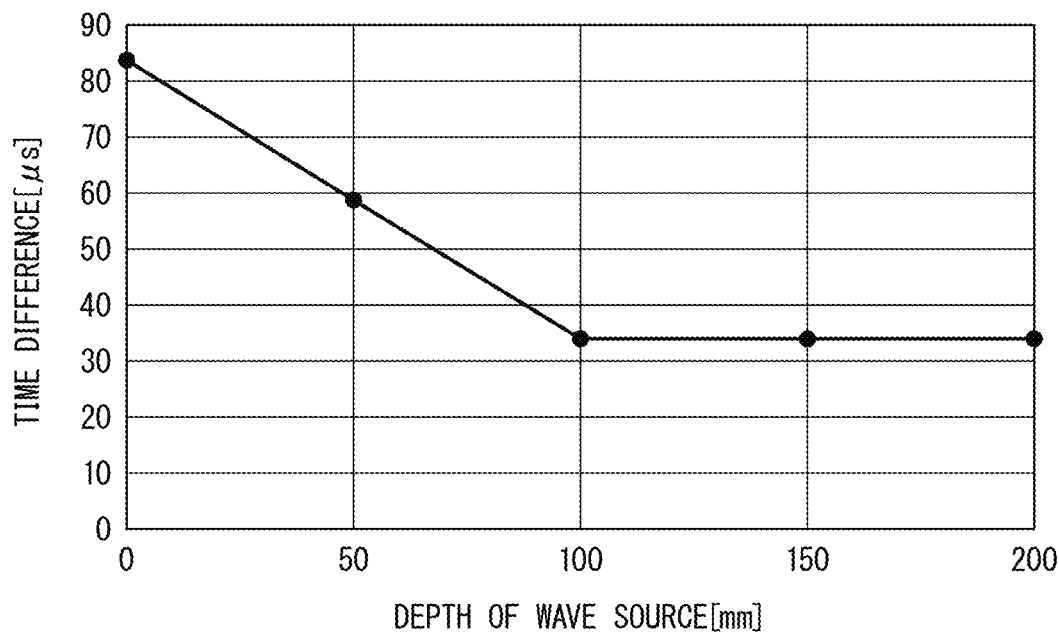
FIG. 8 is a diagram illustrating a calculation result for estimating the depth of damage.

As illustrated in FIGS. 7 and 8, in the measurement target C, there is a difference in the arrival time between the first detection value detected by the first sensor Sn and the second detection value detected by the second sensor Tm depending on the depth of the source of elastic waves. For example, the elastic waves generated from a wave source E1 on the bottom surface C1 are directly input to the second sensor Tm through a path R1 that is closest to the wave source E1. The elastic waves generated from the wave source E1 are propagated through a path R2 in the measurement target C from the wave source E1 and are input to the first sensor Sn through the wave guide W. The path R2 is longer than the path R1 since it is a bypass route. Therefore, the time when the elastic waves reach the first sensor Sn is later than the time when the elastic waves reach the second sensor Tm.

In contrast, the elastic waves generated from a wave source E2, which is generated at a position deeper than the wave source E1 from the bottom surface C1, on the upper surface C3 are propagated through a path R3 closest to the wave source E2 in the measurement target C and are directly input to the second sensor Tm. The elastic waves generated from the wave source E2 are propagated through a path R4 in the measurement target C from the wave source E2 and are input to the first sensor Sn through the wave guide W. As the depth of the wave source from the bottom surface C1 becomes larger, the length of the path R4 becomes substantially equal to the length of the path R3, and a difference in delay between the time when the elastic waves reach the first sensor Sn and the time when the elastic waves reach the second sensor Tm becomes smaller.

The calculation part 14 monitors the detection values of the first sensor Sn and the second sensor Tm obtained by the elastic waves based on the damage occurring in the measurement target C. When the elastic waves based on the damage D occurring in the measurement target C are propagated, the calculation part 14 compares the waveforms of the detection values of the first sensor Sn and the second sensor Tm. The calculation part 14 compares the arrival times when the same waveform is detected by the first sensor Sn and the second sensor Tm. The calculation part 14 can calculate the depth of the source of the elastic waves on the basis of the propagation speed of the elastic waves and the difference between the first arrival time of the elastic waves detected by the first sensor Sn and the second arrival time of the elastic waves detected by the second sensor Tm.

Third Embodiment

Figure 9:
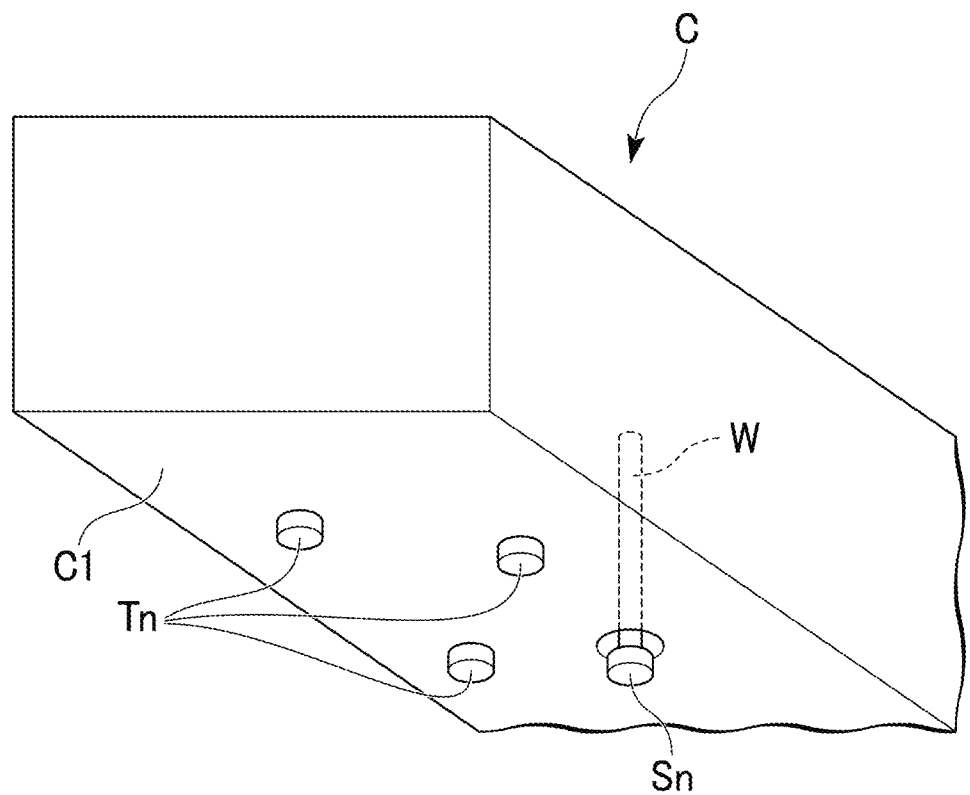
FIG. 9 is a perspective view illustrating the principle of a structure evaluation method according to a third embodiment.

As illustrated in FIG. 9, a structure evaluation system 1A includes at least three or more second sensors Tm and at least one or more first sensors Sn. The calculation part 14 can calculate the three-dimensional position of the source of elastic waves generated in the measurement target C on the basis of the detection values of the at least three or more second sensors Tm and the at least one or more first sensors Sn.

The calculation part 14 calculates the two-dimensional position of the source on the bottom surface C1 on the basis of the arrival time of the second detection values of the at least three or more second sensors Tm and the propagation speed of the elastic waves. The calculation part 14 calculates the depth of the source of the elastic waves on the basis of the propagation speed of the elastic waves and a difference between the first arrival time of the elastic waves detected by the first sensor Sn and the second arrival time of the elastic waves detected by the second sensor Tm. The calculation part 14 can calculate the three-dimensional position of the source of the elastic waves generated in the measurement target C on the basis of the two-dimensional position of the source and the depth of the source.

For example, in a case in which the detection value of the first sensor Sn and the detection value of the second sensor are detected at a certain time and the calculation result of the three-dimensional position of the source shows that the position of the source is concentrated on the side of the measurement target C, it is presumed that damage has occurred in the measurement target C. Further, in a case in which it is calculated that the source of the elastic waves is on the road surface side, an elastic wave source density distribution may be acquired as in the first embodiment on the basis of the detection value of the first sensor Sn and the detection value of the second sensor from the source of the elastic waves.

In each of the above-described embodiments, the calculation part 14 is a software functional part. However, the calculation part 14 may be a hardware functional unit such as an LSI.

According to at least one of the above-described embodiments, the structure evaluation system 1 includes the wave guide W, the first sensor Sn, the second sensor Tm, and the calculation part 14. The wave guide W is formed in a rod shape, is inserted into the hole C2 that is formed at a predetermined depth from the surface of the measurement target C, and has one end fixed to the deepest portion of the hole C2. The first sensor Sn is provided at the other end of the wave guide W which is substantially at the same position as the surface. The second sensor Tm is provided on the surface of the measurement target C. The calculation part 14 estimates the depth of the damage occurring in the measurement target C from the surface on the basis of the first detection value of the elastic waves transmitted to the measurement target C through the wave guide W which has been detected by the first sensor Sn and the second detection value obtained by the elastic waves which has been detected by the second sensor. According to the structure evaluation system 1, it is possible to calculate the depth of the damage occurring in the measurement target C from the bottom surface C1.

As described above, according to the structure evaluation method and the structure evaluation system, the elastic waves propagated to the wave guide W are propagated to the first sensor Sn provided at the other end of the wave guide W without being affected by the damage occurring in the measurement target C which corresponds to the length direction of the wave guide W. Therefore, the second detection value of the second sensor Tm provided on the bottom surface C1 and the first detection value of the first sensor Sn are compared to calculate the depth of the damage occurring in the measurement target C from the bottom surface C1. According to the structure evaluation method and the structure evaluation system, it is possible to estimate the depth of the damage occurring in the measurement target C on the basis of the difference between the first detection value and the second detection value. According to the structure evaluation method and the structure evaluation system, it is possible to calculate the three-dimensional position of the damage occurring in the measurement target C on the basis of a plurality of second detection values of a plurality of second sensors Tm and the first detection value of the first sensor Sn.

In addition, at least some of the functions of the structure evaluation system according to the above-described embodiments may be implemented by a computer. In this case, a program for implementing the functions may be recorded on a computer-readable recording medium, and a computer system may read and execute the program recorded on the recording medium to implement the functions. Here, it is assumed that the "computer system" includes an OS and hardware such as peripheral devices. In addition, the "computer-readable recording medium" means a portable medium, such as a flexible disk, a magneto-optical disk, a ROM, a CD-ROM, a DVD-ROM, or a USB memory device, or a storage device, such as a hard disk provided in the computer system. Further, the "computer-readable recording medium" may include a medium that dynamically stores a program for a short time like a communication line in a case in which the program is transmitted through a network, such as the Internet, or a communication line, such as a telephone line, and a medium that stores a program for a certain period of time like a volatile memory provided in a server or client computer system in this case. Furthermore, the program may be any program for implementing some of the above-mentioned functions, and the above-mentioned functions may be implemented by a combination of the program and a program that has already been recorded on the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A structure evaluation method, comprising:
   detecting a first detection value of an elastic wave generated in a measurement object by a first sensor, through a rod-shaped wave guide which is inserted into a hole formed to a predetermined depth from a surface of the measurement object, one end side of which is fixed to a deepest part of the hole, the other end side of which is substantially the same position as the surface, and on which the first sensor is provided;

detecting a second detection value of the elastic wave by a second sensor provided on the surface; and estimating a depth from the surface to a damage inside the measurement object, based on the first detection value and the second detection value, wherein the estimating the depth from the surface to the damage inside the measurement object comprises:

determining a first elastic wave source density distribution based on first detection values detected by at least three or more of the first sensors;

determining a second elastic wave source density distribution based on second detection values detected by at least three or more of the second sensors;

comparing the first elastic wave source density distribution and the second elastic wave source density distribution; and estimating the depth from the surface to the damage inside the measurement object based on the comparison between first elastic wave source density distribution and the second elastic wave source density distribution.

2. The structure evaluation method according to claim 1, further comprising:

when the elastic wave based on the damage inside the measurement object propagates, calculating a depth of a source of the elastic wave based on a difference between a first arrival time of the elastic wave detected by the first sensor and a second arrival time of the elastic wave detected by the second sensor.

3. The structure evaluation method according to claim 1, further comprising:

estimating a three-dimensional position of a source of the elastic wave based on the first detection value by at least one or more of the first sensors and the second detection value by at least three or more of the second sensors.

4. The structure evaluation method according to claim 1, further comprising:

detecting a plurality of first detection values due to elastic waves generated in the measurement object by the plurality of first sensors, through a plurality of the wave guides having different lengths, one end side of which is fixed to a deepest part of a plurality of the holes having different depths; and estimating the depth of the damage from the surface based on the plurality of first detection values and the second detection value.

5. A structure evaluation system comprising:

a wave guide formed in a rod shape, inserted into a hole that is formed at a predetermined depth from a surface of a measurement target, one end of which being fixed to a deepest portion of the hole;

a first sensor provided at the other end of the wave guide at a position that is substantially the same as the surface;

a second sensor provided on the surface of the measurement target; and a calculation part configured to estimate a depth of damage occurring in the measurement target from the surface on the basis of a first detection value of an elastic wave transmitted to the measurement target which is detected by the first sensor through the wave guide and a second detection value obtained by an elastic wave which is detected by the second sensor, wherein in estimating the depth from the surface to the damage inside the measurement object, the calculation part is configured to:

determine a first elastic wave source density distribution based on first detection values detected by at least three or more of the first sensors;

determine a second elastic wave source density distribution based on second detection values detected by at least three or more of the second sensors;

compare the first elastic wave source density distribution and the second elastic wave source density distribution; and estimate the depth from the surface to the damage inside the measurement object based on the comparison between first elastic wave source density distribution and the second elastic wave source density distribution.

6. The structure evaluation system according to claim 5, wherein, when the elastic wave based on the damage inside the measurement object propagates, the calculation part is further configured to:

calculate a depth of a source of the elastic wave based on a difference between a first arrival time of the elastic wave detected by the first sensor and a second arrival time of the elastic wave detected by the second sensor.

7. The structure evaluation system according to claim 5, wherein the calculation part is further configured to:

estimate a three-dimensional position of a source of the elastic wave based on the first detection value by at least one or more of the first sensors and the second detection value by at least three or more of the second sensors.

8. The structure evaluation system according to claim 5, further comprising:

a plurality of first sensors detecting a plurality of first detection values due to elastic waves generated in the measurement object, through a plurality of the wave guides having different lengths, one end side of which is fixed to a deepest part of a plurality of the holes having different depths, where in the calculation part is configured to estimate the depth of the damage from the surface based on the plurality of first detection values and the second detection value.

9. The structure evaluation system according to claim 5, wherein the calculation part is further configured to:

determine whether the damage inside the measurement object is present at a depth from the surface of the measurement object to the one end of the wave guide, based on the comparison between first elastic wave source density distribution and the second elastic wave source density distribution.

10. The structure evaluation method according to claim 1, further comprising:

determining whether the damage inside the measurement object is present at a depth from the surface of the measurement object to the one end of the wave guide, based on the comparison between first elastic wave source density distribution and the second elastic wave source density distribution.

11. A structure evaluation method, comprising:

detecting a first detection value of an elastic wave generated in a measurement object by a first sensor, through a rod-shaped wave guide which is inserted into a hole formed to a predetermined depth from a surface of the measurement object, one end side of which is fixed to a deepest part of the hole, the other end side of which is substantially the same position as the surface, and on which the first sensor is provided;

detecting a second detection value of the elastic wave by a second sensor provided on the surface; and determining a first elastic wave source density distribution based on first detection values detected by at least three or more of the first sensors;

determining a second elastic wave source density distribution based on second detection values detected by at least three or more of the second sensors;

comparing the first elastic wave source density distribution and the second elastic wave source density distribution; and determining whether the damage inside the measurement object is present at a depth from the surface of the measurement object to the one end of the wave guide, based on the comparison between first elastic wave source density distribution and the second elastic wave source density distribution.

12. The structure evaluation method according to claim 11, further comprising:

when the elastic wave based on the damage inside the measurement object propagates, calculating a depth of a source of the elastic wave based on a difference between a first arrival time of the elastic wave detected by the first sensor and a second arrival time of the elastic wave detected by the second sensor.

13. The structure evaluation method according to claim 11, further comprising:

estimating a three-dimensional position of a source of the elastic wave based on the first detection value by at least one or more of the first sensors and the second detection value by at least three or more of the second sensors.

14. The structure evaluation method according to claim 1, further comprising:

detecting a plurality of first detection values due to elastic waves generated in the measurement object by the plurality of first sensors, through a plurality of the wave guides having different lengths, one end side of which is fixed to a deepest part of a plurality of the holes having different depths; and estimating the depth of the damage from the surface based on the plurality of first detection values and the second detection value.

* * * * *